United States Patent [19] [11] 3,692,292
Rokop et al. [45] Sept. 19, 1972

[54] CYCLIC METAL CUTTING DEVICE

[72] Inventors: Joseph Rokop; Geoffrey W. Hughes, both of Bethel Park, Pa.

[73] Assignee: Pennsylvania Engineering Corporation

[22] Filed: Jan. 4, 1971

[21] Appl. No.: 103,643

[52] U.S. Cl. ..........................266/23 K, 219/125 PL
[51] Int. Cl. ...............................................B23k 7/02
[58] Field of Search....266/23 K, 23 M, 23 NN, 23 P, 266/23 R, 23 B, 23 E; 425/290, 295; 83/319; 219/124, 125 PL; 33/23 C, 23 R; 164/263

[56] References Cited

UNITED STATES PATENTS

| 1,898,955 | 2/1933 | Hancock | 266/23 B |
| 2,571,196 | 10/1951 | Buckham | 266/23 K |
| 3,035,946 | 5/1962 | Kleine | 266/23 K X |
| 3,164,713 | 1/1965 | Banks | 219/124 |
| 3,165,017 | 1/1965 | Galabert | 33/32 C X |
| 3,328,555 | 6/1967 | Dinter | 266/23 K X |
| 3,497,195 | 2/1970 | Kalkhof | 164/263 X |
| 3,558,117 | 1/1971 | Hess | 266/23 R |
| 3,558,066 | 6/1971 | Reinfeld | 164/263 |

Primary Examiner—J. Spencer Overholser
Assistant Examiner—John S. Brown
Attorney—Wiviott & Hohenfeldt

[57] ABSTRACT

Cutting torches are actuated transversely to cut into discrete lengths a metal strand that is moving longitudinally. The torches are on a longitudinally movable main carriage. The leading end of an incoming continuous strand engages the carriage and advances it longitudinally at which time the torches are shifted transversely by a follower and cam arrangement so that the torches cut in a straight line across the strand. Feelers on transversely movable carriages engage the edges of the strand and correctly position the torches which are transversely movable between the edge feeler carriages. Cams influence the torches toward the center of the strand where their cutting paths overlap. When a cut is completed the feeler and torch carriages shift transversely and the main carriage is disengaged from the strand so that return of the main carriage restores the feeler and torch carriages to their initial position.

12 Claims, 5 Drawing Figures

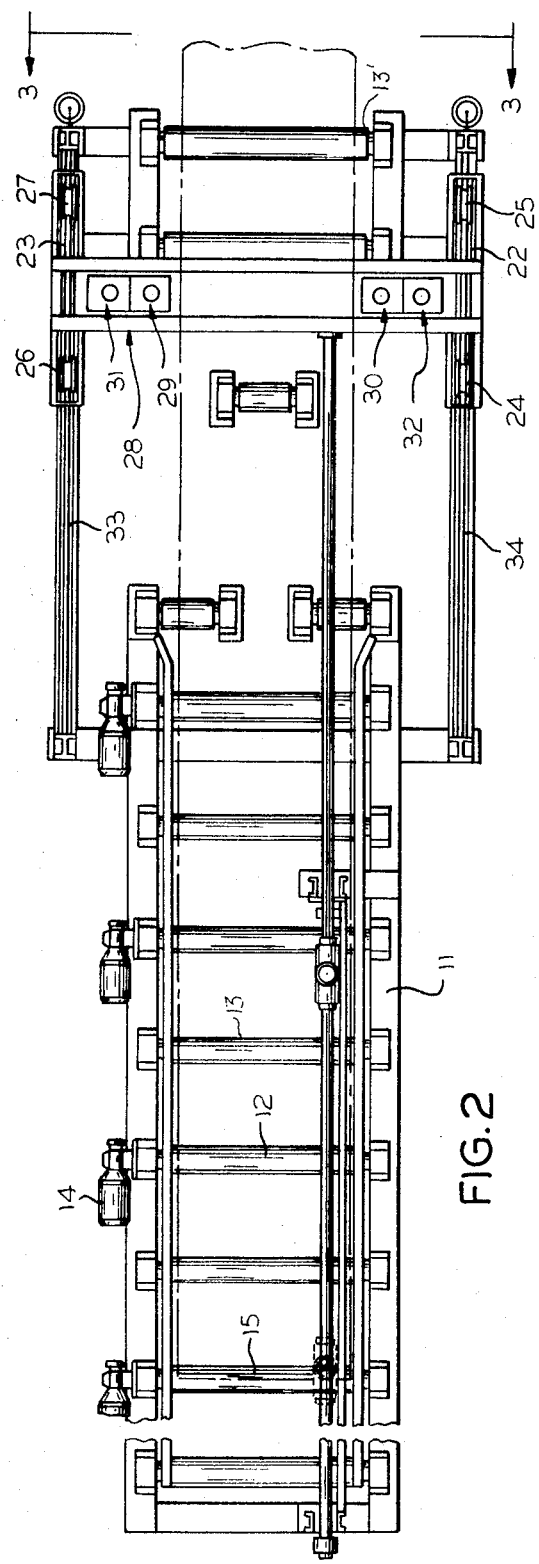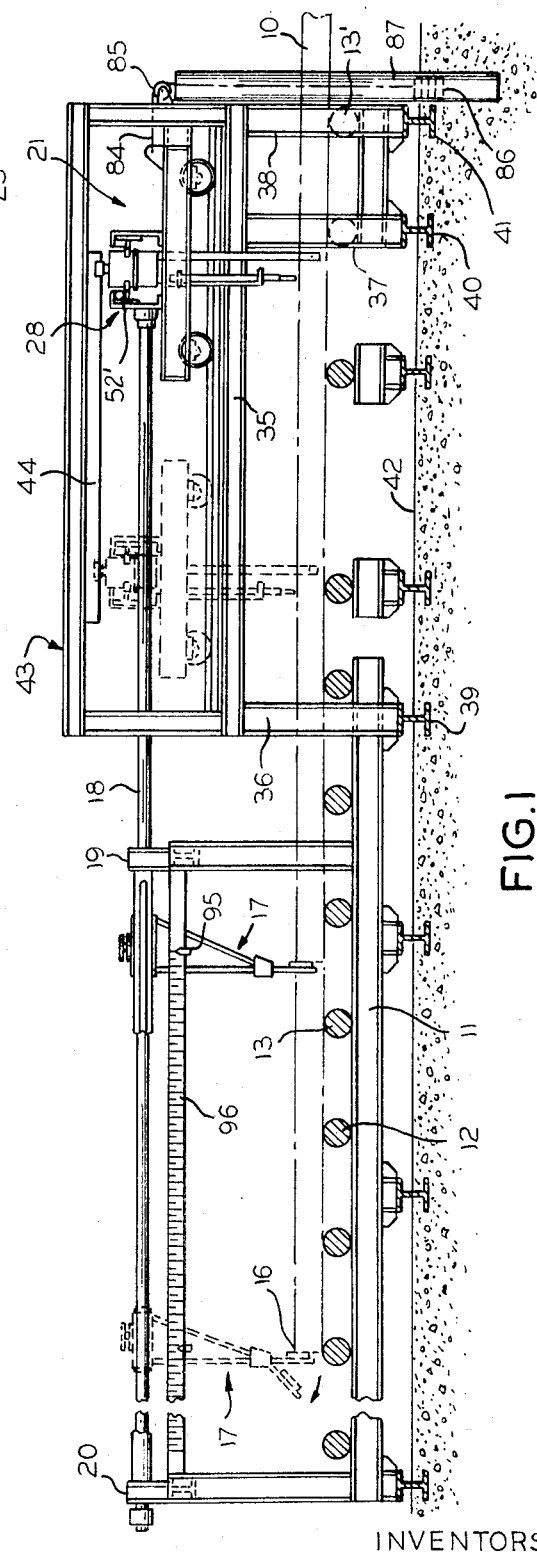

INVENTORS
JOSEPH ROKOP
GEOFFREY W. HUGHES
BY [signature]

ATTORNEY

INVENTORS
JOSEPH ROKOP
GEOFFREY W. HUGHES
BY
ATTORNEY 3,692,292

CYCLIC METAL CUTTING DEVICE

BACKGROUND OF THE INVENTION

It is customary to cut a hot metal strand emerging from a continuous casting machine into discrete lengths without interrupting the longitudinal travel of the strand. An established cutting method uses an oxyacetylene torch which is translated longitudinally with the strand while the torch is being swung transversely to cut the strand. Moving the torch synchronously with the longitudinal travel of the strand results in a straight cut across the strand.

One of the problems with prior art devices of this type is to position the tip of the cutting torch at the exact edge of the strand before starting the cut. This problem results from the edges of the strand not always being in the same transverse relationship to the torch as the strand enters the cutoff apparatus. Some sophisticated but unduly complex mechanisms have been developed to cope with the problem of properly positioning the torch tip before cutting is initiated. Known devices require some care in adjustment for a given size strand and they are not readily adaptable to strands of different sizes.

SUMMARY OF THE INVENTION

Among the objects of the present invention are to provide a cyclic strand cutoff apparatus which is simple in construction, has a minimum of moving parts, is not susceptible to getting out of adjustment, that has feelers which properly position the torch tips at the edge of the strand before cutting is initiated and that translates the torches in a single plane as opposed to swinging them through an arc. The last mentioned feature provides the advantage of maintaining the torch tip at a uniform distance from the strand during the entire transverse cutting operation.

Briefly stated, the new cutting apparatus has a first main carriage mounted on tracks which extend in the direction of longitudinal travel of the strand. When the strand reaches a predetermined position in the cutting apparatus, it engages the main carriage and causes it to translate at the same longitudinal speed as the strand. The main carriage has transverse tracks that support edge feeler carriages which are spaced apart approximately the width of the strand. On the same transverse tracks between the edge feeler carriages are a pair of oxyacetylene torch carriages which are urged yieldably toward the edge feeler carriages with a cable and counterweight system. When the first main carriage begins advancing longitudinally, the feeler causes the torch carriages to assume a position in which the tips of the torches are positively aligned with the tips of the edge feelers at the opposite edges of the strand. At a predetermined moment during the longitudinal travel of the first carriage a set of followers on the torch carriages engages with stationary cams which urge these carriages to move laterally toward the center of the strand. Another set of cams then causes the edge feeler carriages to diverge from the strand so that the edge feelers are not subject to fusing into the hot strand during the cutting operation.

Achievement of the foregoing and other more specific objects of the invention will appear from time to time throughout the course of the ensuing more detailed description of a preferred embodiment of the invention taken in conjunction with the drawings.

DESCRIPTION OF THE DRAWINGS

FIG. 1 is a side elevational view of an embodiment of the invention;

FIG. 2 is a top plan view of the apparatus shown in the preceding figure with some of the upper parts removed;

DESCRIPTION OF A PREFERRED EMBODIMENT

Figure 3:
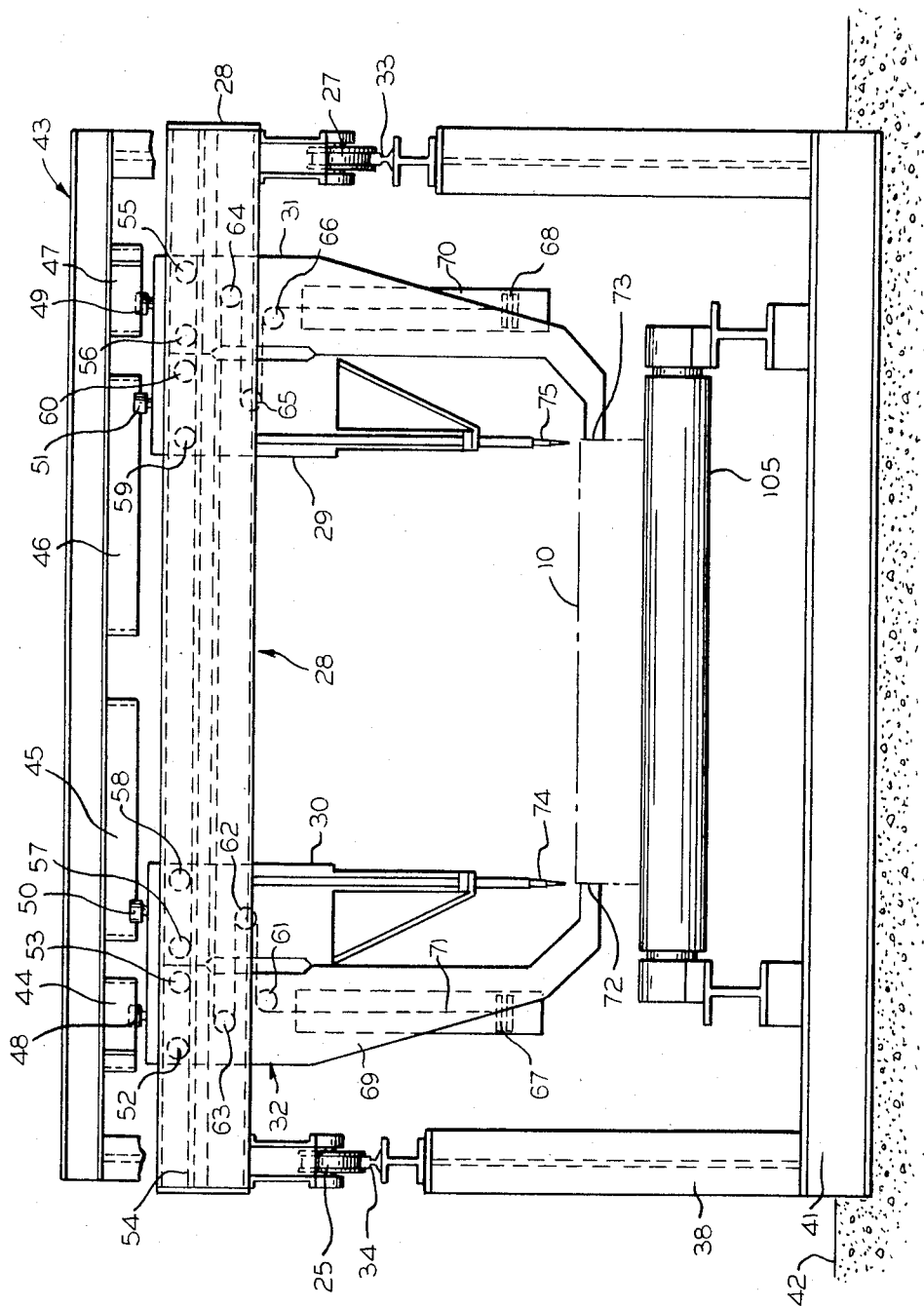
FIG. 3 is an end elevation view taken in the direction of the plane 3—3 in FIG. 2.

In FIG. 1 the hot metal strand which is to be cut into discrete lengths is shown in phantom lines and marked with the reference numeral 10. It is customary to call the strand a billet if it has a square cross section and to call it a slab if it is much wider than it is thick. In the FIG. 1 example the strand advances longitudinally from the right to the left and after a discrete length is cut off in the apparatus it continues its advance to the left.

The cutoff apparatus comprises a floor mounted table 11 which supports a plurality of rollers such as 12 and 13 which assist in supporting the strand and transporting it through the apparatus. Some of the rollers such as 13 and 13' are merely idlers. Other rollers such as 12 are rotatably driven by motors 14 which when energized cause strand 10 to advance longitudinally of the cutoff apparatus. When the cutoff is completed the metal piece is freed from engagement with the apparatus at which time the moving strand advances to a set of final rollers such as 15 which may rotate at a speed that is higher than rollers 12 so that the piece may be removed quickly from the path of the leading end of the incoming strand.

When the leading end 16 of strand 10 reaches a certain position on the rollers within the apparatus, the strand encounters a stop which is generally designated by the reference numeral 17. The stop is adjustably clamped to a push rod 18 which is journaled for sliding in bearing structures 19 and 20. Longitudinal advancement of strand 10 produces a force against stop 17 which shifts push rod 18 longitudinally to the left. The push rod is connected to a first longitudinally movable main carriage which is generally designated by the numeral 21.

Carriage 21 comprises a pair of end trucks 22 and 23 which have wheels 24, 25, 26 and 27. Trucks 22 and 23 are bridged by a transverse beam 28 which supports a pair of roller mounted torch carriages 29 and 30 and a pair of roller mounted end feeler carriages 31 and 32 which will be described in detail subsequently.

The end trucks 22 and 23 of main carriage 28 are adapted to transport the latter longitudinally and in parallelism with the moving strand 10 on a pair of rails 33 and 34. These rails are supported on structural beams such as 35 which are in turn supported on vertical posts 36, 37 and 38. These posts stand on I-beams 39, 40 and 41 which are embedded in the concrete floor 42. There is also a superstructure frame 43 which appears in FIG. 1 but is broken away in FIG. 2. Underhung from the top of superstructure 43 are four stationary cams 44, 45, 46 and 47 which may be seen in FIG. 1 taken in conjunction with FIGS. 3 and 4. Cams 44 and 47 cooperate with follower rollers 48 and 49 which extend from the top of the feeler carriages 32 and 31, respectively. The inner pair of cams 45 and 46 cooperate with roller followers 50 and 49 which extend from the top of torch carriages 30 and 31, respectively. A further explanation of how these cams cooperate with the torch and feeler carriages will be given after the structure of the torch carriages 29 and 30 and the feeler carriages 31 and 32 is described.

FIG. 3 shows how the left feeler carriage 32 is provided with a pair of rollers 52 and 53 that run on a transverse track 54 which is carried on transverse beam 28. There are similar rollers on the backside of feeler carriage 32, the one roller which is marked 52' being visible in FIG. 1. The right feeler carriage 31 has a similar pair of rollers 55 and 56 which also run on a transverse track 54. There is also a pair of rollers on the backside of feeler carriage 31 which corresponds with rollers 55 and 56.

Torch carriage 30 is also provided with a pair of rollers 57 and 58 which run on transverse track 54. The right torch carriage 29 also has a pair of rollers 59 and 60 which run on track 54. There are pairs of rollers, not shown, on the backside of torch carriages 29 and 30 which correspond with 57, 58 and 59, 60.

Before a strand 10 enters the cutoff apparatus, torch carriage 30 abuts feeler carriage 32 and torch carriage 29 abuts its adjacent feeler carriage 31. The torch and feeler carriages are initially held on contact with a pair of counterweights 67 and 68 which move vertically in guide tubes 69 and 70, which are mounted on the feeler carriages. The two counterweights are connected together by means of a cable 71. As can be seen particularly well in FIG. 3, cable 71 runs on feeler carriage pulley 61 and loops around pulley 62 on the torch carriage and then returns to pulley 63 on the feeler carriage after which the cable extends to the opposite side of the apparatus where it follows the same reentrant path overy pulleys 64, 65 and 66. The tensile force created in cable 71 thereby tends to keep the torch and feeler carriages together. However, it will be evident that the torch carriages 29 and 30 can be moved toward the center line of strand 10 independently of the feeler carriages and in opposition to the gravitational force of counterweights 67 and 68. If a strand 10 is admitted to the apparatus and main carriage 21 is shifted longitudinally by means of push rod 18, the feeler contact tips 72 and 73 will engage the edges of the strand 10 thus prohibiting the feeler carriages 31 and 32 from moving inwardly. Note in FIG. 3 that when the edge feeler contact tips 72 and 73 engage the edges of strand 10 the torch tips 74 and 75 are directly over the edges of strand 10. As will appear later, when strand 10 advances longitudinally to a predetermined point in the apparatus, the torch carriages 29 and 30 and the torch tips 74 and 75 which they carry will start shifting transversely toward each other and toward the center of strand 10. The transverse path of at least one torch tip should be longer than the other so that there is complete cutoff of the strand. The torch carriages are actually shifted toward center under the influence of roller cams 50 and 51 reacting against the surfaces of cams 45 and 46, respectively. The rollers follow the cams to converge the cutting torch tips toward center as a result of main carriage 28 being advanced longitudinally when the strand 10 reaches a certain point in the cutoff apparatus.

Figure 4:
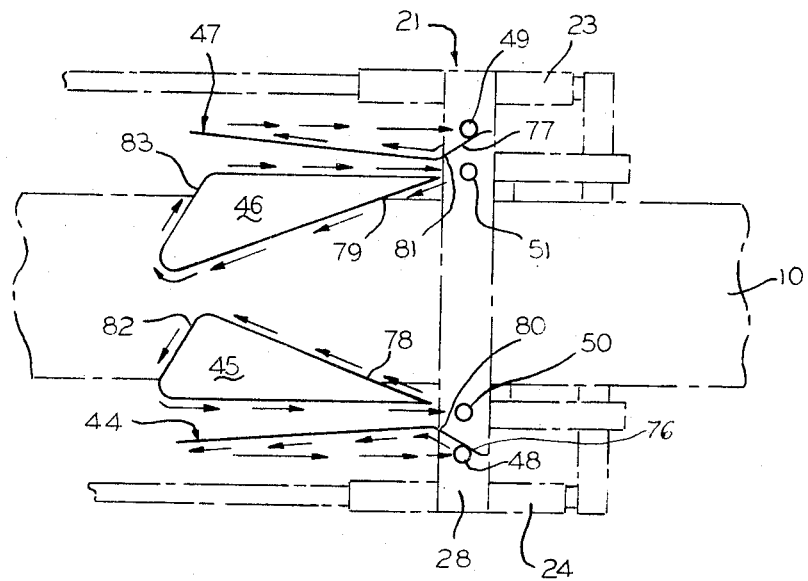
FIG. 4 is a fragmentary and essentially schematic view showing the arrangement of some of the parts as they would be seen from the top of FIG. 1.

Control of the torch carriages 29 and 30 and the feeler carriages 31 and 32 may be visualized most easily be referring to FIG. 4. This view shows the cams 44, 45, 46 and 47 and their associated carriage followers 48, 49, 50 and 51 from the top. In reference to this figure, assume that strand 10 has entered the cutoff apparatus and has not yet reached the stop 17 so that carriage 21 is not urged forward longitudinally at this moment. Then the feeler carriage rollers 48 and 49 will bear against the short inwardly angularly directed cam sections 76 and 77 as can be seen in FIG. 4. At this time the torch carriage followers 50 and 51 will not have been advanced toward the inside legs 78 and 79 of cams 45 and 46, respectively. Assume now that the leading end 16 of strand 10 has abutted stop member 17 so as to pull main carriage 21 forward longitudinally under the influence of push rod 18. This will begin to advance main carriage 21 to the left in FIG. 4 and edge feeler followers 48 and 49 will start to converge inwardly along short angularly disposed cam sections 76 and 77. As the feeler carriage followers 48 and 49 begin to move toward each other, the contact tips 72 and 73 of the feelers will eventually reach and contact the edges of strand 10. This happens when edge feeler followers 48 and 49 are still quite far back on their short cam sections. When the edge feelers make contact, the torch tips 74 and 75 are directly over the edges of strand 10 because the torch carriages are maintained in contact with their adjacent feeler carriages under the influence of counterweights 67 and 68 at this stage of the operation. While the feeler carriage followers 48 and 49 are still on their short cam sections 76 and 77, and the edge feelers are in contact with the strand, the torches begin to preheat the edges of the strand.

As the main carriage 21 is shifted longitudinally to the left as viewed in FIG. 4, under the influence of push rod 18, feeler carriage followers 48 and 49 will, in due course, arrive at points 80 and 81 where the feeler carriage cams 44 and 47 change their angular direction after which further movement of carriage 21 will move followers 48 and 49 onto the long diverging sections of feeler cams 44 and 47. This separates the feelers 72 and 73 from the edges of the hot strand 10.

As feeler carriage followers 48 and 49 advance longitudinally on their short cam sections 76 and 77, the torch carriage followers 50 and 51 advance in angularly parallel paths with the feeler carriage followers for an interval. This results from the fact that as the feeler carriages yield inwardly on their cams, the counterweights descend and keep the torch carriages against the feeler carriages. However, when the feeler carriage followers 48 and 49 reach the points of divergence 80 and 81, the torch carriage followers 50 and 51 have then reached their long straight sections 78 and 79 on respective cams 45 and 46. At this time the torch carriages 29 and 30 start shifting across the strand 10 under the influence of their followers 50 and 51 reacting against angularly directed cam surfaces 78 and 79. Since the main carriage 21 which supports the torch carriages is coupled with the strand at this time, there is no relative longitudinal motion between the torches and the strand. Hence, the torches only move transversely with respect to the strand and a straight cut is made directly across the strand.

As a result of torch tip 74 being offset transversely with respect to torch carriage follower 50 and of tip 75 being offset with respect to follower 51 as viewed in FIG. 3, it will be evident in conjunction with FIG. 4 that torch tips 74 and 75 may pass beyond the longitudinal center line of strand 10. But both tips do not have to go beyond center as long as the path of one extends into the path of the other for cutoff to be complete. This is governed by the respective lengths and the angles of cam sections 78 and 79.

As the main carriage 21 is pulled forward or longitudinally, the cutting torch carriage followers 50 and 51 will reach the end of long cam surface sections 78 and 79. This liberates torch followers 50 and 51 so that they may go around the corner of their cams 45 and 46 and follow along the outwardly directed cam sections 82 and 83. Since movement of the torch carriages 29 and 30 toward the center has resulted in counterweights 67 and 68 being elevated, their stored energy causes the torch carriages to diverge outwardly along cam sections 82 and 83 at this time. The torch carriages 29 and 30 then traverse along their tracks 54 on cross beam 28 and stop against their adjacent feeler carriages 31 and 32. At about this time, the stop means 17 which has been engaged by the leading end 16 of the strand 10 is released and the severed piece of the strand is free to advance to the left as viewed in FIG. 1 so it gets out of the way. As can be seen in this figure, there is a cable 84 running over a pulley 85 which is attached to superstructure 43. This cable connects with a counterweight 86 which is in a guide tube 87. When carriage 21 is advanced longitudinally, counterweight 86 is elevated and stores energy. When stop 17 is uncoupled from the strand, push rod 18 is freed and carriage 21 is free to return to its starting position under the influence of counterweights 86. The apparatus is then ready for recycling.

The torches may be left burning all of the time if desired or they may be programmed to turn on and off at the proper times. When cutting is complete and the torches are swept laterally over the strand, the high pressure oxygen jet which is incidental to cutting with an oxyacetylene torch should be preferably turned off although this may not be necessary in view of the torch sweeping so rapidly over the strand as the torch carriages are returning to their spaced apart positions. Means may be provided for turning the torches on at an appropriate time to start preheating the edge of the strand and to turn on the high pressure oxygen jet at an appropriate time. These torch sequencing means are not shown since they may be devised by those who are skilled in the art.

Figure 5:
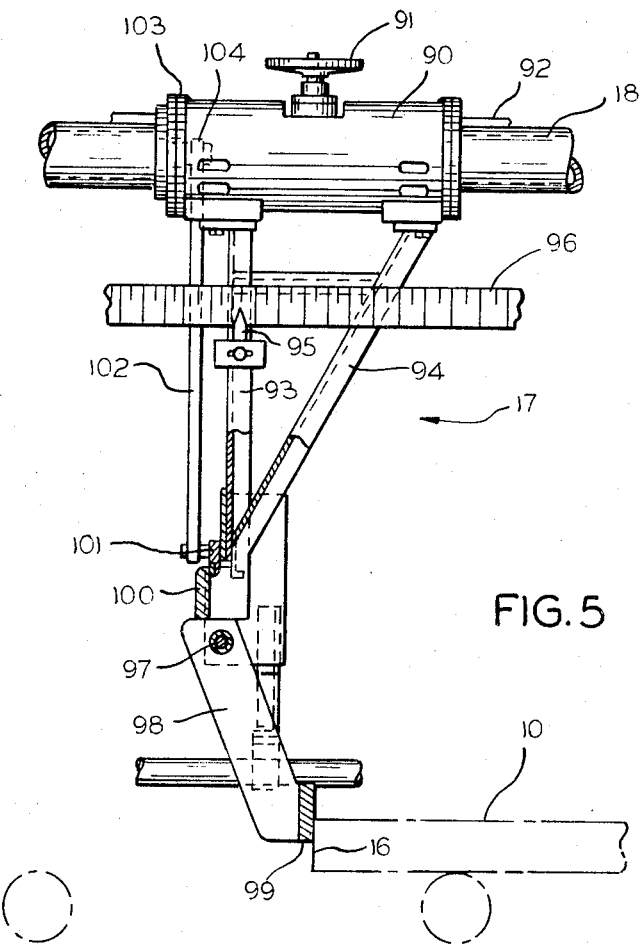
FIG. 5 shows a side elevation of some of the parts of the stop mechanism which is engaged by the strand to advance the first or main carriage.

FIG. 5 is an isolated view of the stop means 17 which are engaged by the leading end 16 of the strand 10 to advance main carriage 21 longitudinally. The stop means are not part of the present invention and will be described in general terms. The stop means comprises a cylinder 90 which is positionable on push rod 18 by tightening a latching wheel 91 which causes engagement with a gear rack 92. Extending downwardly from the stop means cylinder 90 are a pair of brackets 93 and 94. Mounted on one of the brackets is a pointer 95 which cooperates with a stationary scale 96. The scale 96 parallels the push rod 18 as can be seen in FIG. 1.

Mounted on a pin 97 near the bottom end of bracket 93 is a pivotal stop lever 98. The stop lever has a strand engageable surface 99 for engagement by the leading end 16 of strand 10. Normally, stop lever 98 is locked against pivoting as a result of an upstanding interfering element 100 being engaged by a latch 101. The latter is pivotally joined with a connecting link 102 which extends upwardly toward cylinder 90. At one end of the cylinder is a rotatable release arm flange 103 from which an arm extends rearwardly and pivotally connects with link 102 at 104. The construction of the device is such that when push rod 18 traverses a certain distance, mechanism within cylinder 19 will turn release arm flange 103 at a predetermined moment, causing a lifting force to be applied on connecting link 102. This force causes the latch 101 to be removed from behind latching element 100 in which case stop lever 98 is free to pivot and allow strand 10 to pass. Upon this event, as explained earlier, push rod 18 is liberated for being retracted by main carriage 21 under the influence of counterweight 86.

In FIG. 1, stop means 17 is shown in phantom lines when it is in its longitudinally advanced position and in solid lines when it is in its original position which coincides with the time at which it is first engaged by the incoming leading end 16 of strand 10. Pointer 95 when set as shown results in the shortest piece being cut from strand 10. When the stop 17 is set further to the left along push rod 18 as viewed in FIG. 1, a greater length of strand 10 will enter the cutoff apparatus before main carriage 21 begins to advance and the piece cut off will be correspondingly longer.

Adapting the apparatus for cutting strands of different widths involves repositioning cams 45 and 46 so as to adjust the space between the edge feelers. Regardless of the width of the strand, advancement of the main carriage 21 will always result in bringing the edge feelers into contact with the edge of the strand and simultaneously positioning the torch tips in the same vertical plane as the edges of the strand and the faces of the feeler tips 72 and 73.

Briefly summarizing the operation of the apparatus, a long continuous strand 10 of cast metal advances over the first roller 13' in a series of rollers within the cutoff apparatus until the leading end 16 of the strand 10 abuts stop mechanism 17. This begins longitudinal advancement of main carriage 21. Initial advancement of the carriage 21 causes the feeler carriages to advance toward each other and the feelers 72 and 73 to engage the edge of the strand 10. The torch tips 74 and 75 are simultaneously positioned at the edges of the strand 10 to begin the preheating interval. Further progress of carriage 21 causes the torch carriages 29 and 30 to be urged inwardly under the influence of cams 45 and 46 which are engaged by their followers and the strand is burned off. When the torch carriages reach the ends of their guiding cams, they are liberated for returning transversely to their original positions and the strand 10 is disengaged from the main carriage so that it can retract to its initial position. This takes the feeler and torch carriages back to their initial position, also. The feelers will always engage the edges of the strand and position the torches at the edges even though there is considerable misalignment between the incoming strand and the feelers. If one of the feelers strikes an edge of the strand before the other, the gap between the other and the strand will close by reason of counterweights urging the carriages toward each other.

The cutoff mechanism is self-adjusting within reasonably expected tolerances in the width and misalignment of the strand.

The above described illustrative embodiment of the invention employs two feeler carriages with their associated cams and followers, and two torch carriages with their cams and followers. Two carriage counterweights were also employed. Those skilled in the art will understand, however, that apparatus which is designed for cutting off narrow strands may use the design principles set forth above but actually employ only one torch carriage, one feeler carriage, one cam for each carriage and one cable and counterweight system. Moreover, other cutting means such as a laser beam, mechanical cutting devices and torches using various gases could be substituted for the conventional oxyacetylene torch used in this example of the invention.

Although a preferred embodiment of the invention has been described in considerable detail, such description is to be considered illustrative rather than limiting, for the invention may be variously embodied and is to be limited only by interpreting the claims which follow.

I claim:

1. Apparatus for cutting a discrete length from an elongated metal piece comprising:
   a. a first carriage means mounted for bidirectional movement along the longitudinal travel line of a metal piece that is to be cut;
   b. an edge feeler carriage means mounted for transverse movement on said first carriage means and carrying feeler means which are adapted to contact the edge of a traveling metal piece;
   c. a torch carriage means mounted for transverse movement on said first carriage means adjacent said edge feeler carriage means and carrying a torch means which is adapted to cut a traveling metal piece;
   d. a cam follower connected to each individual edge feeler and torch carriage means;
   e. a first relatively stationary cam means cooperating with the cam follower of said feeler carriage means, said first cam means being shaped to allow its associated follower means to execute transverse and longitudinal components of motion,
   f. a second relatively stationary cam means of predetermined length cooperating with the cam follower of said torch carriage means, said second cam means being shaped to allow its associated follower means to execute transverse and longitudinal components of motion;
   g. stop means connected to said first carriage means and operable by a traveling metal piece to advance said first carriage means, whereupon said torch carriage means is urged transversely by its associated cam means to cause said torch means to move in the transverse cutting direction across the metal piece as the torch means advances longitudinally at the same speed as the metal piece;
   h. said edge feeler carriage means moving at first under the influence of its cam follower to cause contact between the edge feeler and metal piece to thereby position said adjacent torch carriage means so that the torch is at the edge of said metal piece;
   i. means releasing said stop means to permit return of said first carriage means from its longitudinally advanced position to its initial position in response to completion of cutting; and
   j. means returning said torch carriage transversely to its initial position in response to completion of cutting.

2. The invention set forth in claim 1 including:
   a. means yieldably biasing said feeler carriage means and said torch carriage means toward each other, said second cam means causing said torch carriage means to separate transversely from said feeler carriage means as the first carriage moves longitudinally to thereby load said biasing means;
   b. said biasing means being operative to return said torch carriage means transversely toward said feeler carriage means when the follower associated with the torch carriage means has transversed the predetermined length of the second cam means.

3. The invention set forth in claim 1 wherein:
   a. said second stationary cam means is substantially triangular in shape and has a first side directed angularly across the travel line of said metal piece, a second side directed angularly away from said travel line and a third side in substantial parallelism with the travel line;
   b. means yieldably biasing said torch carriage means toward said feeler carriage means on said track means, said second cam means causing said torch carriage means to separate transversely from said feeler carriage means as said first carriage means is advanced longitudinally to thereby load said biasing means;
   c. said biasing means being operative to urge said torch carriage means along said second angular side away from the travel line after the torch carriage means follower has traversed the first angular side;
   d. said first carriage means return means urging said torch carriage means to return to its initial position with its follower guided by said third side of the triangular cam means.

4. The invention set forth in claim 1 wherein:
   a. said edge feeler carriage cam means is shaped with a first straight section converging toward the travel line of the metal piece and a second continuous straight section diverging away from said line, whereby the edge feeler may converge into contact with said metal piece and then diverge from said metal piece.

5. The invention set forth in claim 1 wherein:
   a. said edge feeler carriage cam means has a first straight section directed at an angle across the longitudinal travel line of the metal piece, and said torch carriage cam means has a straight section which is parallel to the last named straight section, whereby said adjacent feeler and torch carriage means will not separate during a preheating interval as said first carriage means is undergoing the initial portion of its longitudinal travel.

6. Apparatus for cutting a moving metal piece into discrete lengths comprising:
   a. a first carriage means adapted to advance from an initial position along the longitudinal path traversed by the metal piece,
   b. means adapted to retract said first carriage to its initial position when the piece has been cut,
   c. a pair of edge feeler carriages mounted in spaced apart opposed relation on said first carriage and being adapted to move transversely thereon, said edge feeler carriages each having an edge feeler adapted to contact respective opposite edges of the metal piece and said edge feeler carriages also carrying a cam follower,
   d. a pair of torch carriages mounted in spaced apart relation on said first carriage between and respectively adjacent said feeler carriages and adapted to move transversely on the first carriage means, said torch carriages each carrying a torch that is directed toward an edge of the metal piece and said torch carriages also carrying a cam follower;
   e. means biasing each torch carriage toward its adjacent feeler carriage and also biasing the torch and feeler carriage pairs toward each other,
   f. a pair of stationary feeler carriage cams disposed adjacent the travel path of said first carriage means, the said followers on said feeler carriages cooperating with their respective cams and preventing the carriages from moving transversely toward each other due to the biasing means,
   g. a pair of stationary torch carriage cams disposed adjacent the travel path of the metal piece, the said followers on said torch carriages cooperating with their respective cams to maintain the torch carriage in initial abutment with said feeler carriage, the said torch carriage cams each having first straight sections that are at opposite converging angles with the longitudinal path of the metal piece for urging said torch carriage followers transversely, whereby said torches may cut said metal piece transversely without longitudinal movement of the torch means relative to the metal piece during the time that the first carriage is advancing.

7. The invention set forth in claim 6 wherein:
   a. said torch carriage cam means each have second sections which diverge oppositely in a direction away from the path of the metal piece, said second sections being engaged by said torch carriage follower means sequentially to engagement with said first section, whereby to guide said torch carriages transversely outward under the influence of said biasing means.

8. The invention set forth in claim 7 wherein:
   a. said torch carriage cam means each have third sections which extend generally along the longitudinal path of the first carriage means, the said third section being engaged by said torch carriage follower means sequentially to said first section whereby to guide said torch carriage means back toward their initial position in response to retraction of said first carriage means toward its initial position.

9. The invention set forth in claim 6 wherein:
   a. said feeler carriage cam means are juxtaposed to the torch carriage cam means, said feeler carriage cam means each having first sections at a converging angle with respect to the path of the metal piece and a second section at a diverging angle thereto whereby to guide said edge feelers into contact with the edges of the metal piece when the feeler carriage followers are on the first sections and to separate said edge feelers from the metal piece as the follower means progress to the second sections.

10. The invention set forth in claim 6 wherein:
    a. said biasing means includes pulleys on each of said torch and feeler carriages,
    b. vertically movable counterweights,
    c. a cable means having its opposite ends attached to respective counterweights and its intermediate portions running symmetrically around a pulley on each of the adjacent torch and edge feeler carriages, whereby said torch feeler carriages may separate from said edge feeler carriages under the influence of said torch carriage cams for transverse movement independently thereof in opposition to the force of said counterweights.

11. The invention set forth in claim 6 wherein:
    a. said means to return said first carriage means to its initial position comprises pulley means,
    b. a vertically movable counterweight,
    c. cable means having one end attached to said first carriage means and another end attached to said counterweight, whereupon said counterweight will influence the return of said first carriage means from its advanced position to its initial position.

12. The invention set forth in claim 6 including:
    a. a push rod means attached to said first carriage means and extending along the longitudinal travel path of said metal piece;
    b. a releasable stop means that is adjustably positionable on the push rod means and is engageable by the leading end of the advancing metal piece when said leading end is the desired length away from said torch means to thereby advance said first carriage means longitudinally, and
    c. means releasing said stop means in response to the push rod means being advanced a predetermined distance whereby to permit retraction of said first carriage means to its initial position.

* * * * *